United States Patent [19]

Kaneshige et al.

[11] Patent Number: 5,346,536
[45] Date of Patent: Sep. 13, 1994

[54] PROCESS FOR SEPARATING NITROGEN GAS

[75] Inventors: Isao Kaneshige, Kurashiki; Tsuneo Genba; Takeshi Tamaru, both of Okayama; Tetsuhiko Matsuura, Bizen, all of Japan

[73] Assignee: Kuraray Chemical Co., Ltd., Bizen, Japan

[21] Appl. No.: 32,023

[22] Filed: Mar. 16, 1993

[30] Foreign Application Priority Data

Mar. 17, 1992 [JP]  Japan ................... 4-092054

[51] Int. Cl.$^5$ ............................................. B01D 53/04
[52] U.S. Cl. ..................................... 95/103; 95/119; 95/138; 95/148
[58] Field of Search ............... 95/96, 98, 101–103, 95/105, 119, 122, 138, 148

[56] References Cited

U.S. PATENT DOCUMENTS

| | | | |
|---|---|---|---|
| 3,430,418 | 3/1969 | Wagner | 95/122 X |
| 3,923,477 | 12/1975 | Armond et al. | 95/103 |
| 4,222,750 | 9/1980 | Gauthier et al. | 95/102 |
| 4,256,469 | 3/1981 | Leitgeb | 95/138 X |
| 4,264,339 | 4/1981 | Jüntgen et al. | 95/96 |
| 4,348,213 | 9/1982 | Armond | 95/138 X |
| 4,376,639 | 3/1983 | Vo | 95/138 X |
| 4,376,640 | 3/1983 | Vo | 95/138 X |
| 4,415,340 | 11/1983 | Knoblauch et al. | 95/96 |
| 4,439,213 | 3/1984 | Frey et al. | 95/138 X |
| 4,440,548 | 4/1984 | Hill | 95/138 X |
| 4,494,966 | 1/1985 | Umeki | 95/138 X |
| 4,576,614 | 3/1986 | Armond et al. | 95/138 X |
| 4,925,461 | 5/1990 | Gemba et al. | 95/138 X |
| 4,985,052 | 1/1991 | Haruna et al. | 95/138 X |
| 5,002,591 | 3/1991 | Stanford | 95/98 |
| 5,108,467 | 4/1992 | Schroter et al. | 95/138 X |
| 5,176,722 | 1/1993 | Lemcoff et al. | 95/138 X |

FOREIGN PATENT DOCUMENTS

| | | |
|---|---|---|
| 0099211 | 1/1984 | European Pat. Off. . |
| 0273723 | 7/1988 | European Pat. Off. . |
| 0380723 | 8/1990 | European Pat. Off. . |
| 3338494 | 5/1985 | Fed. Rep. of Germany . |
| WO87/00076 | 1/1987 | World Int. Prop. O. . |

*Primary Examiner*—Robert Spitzer
*Attorney, Agent, or Firm*—Oblon, Spivak, McClelland, Maier & Neustadt

[57]   ABSTRACT

A process for separating nitrogen which comprises, with a nitrogen gas separation apparatus of a pressure-swing adsorption type, a gas transfer step between an adsorber having completed an adsorption step with another adsorber having completed a regeneration step. The gas transfer step further comprising discharging part of the gas being transferred out of the system. This process provides, with compact equipment, high-purity product nitrogen with a purity of at least 99.99%, which has been considered difficult to obtain with conventional pressure-swing adsorption apparatuses.

4 Claims, 2 Drawing Sheets

PROCESS FOR SEPARATING NITROGEN GAS

BACKGROUND OF THE INVENTION

1. Field of the invention

The present invention relates to a process for separating nitrogen gas from a gaseous mixture principally comprising nitrogen and oxygen, such as air and, more specifically, to a process for obtaining a high-purity nitrogen gas by pressure-swing adsorption (hereinafter referred to as "PSA") process using adsorbers packed with carbon molecular sieve (hereinafter referred to as "CMS").

2. Description of the prior art

CMS, with its different adsorption rates for various gases, has the excellent property of removing by adsorption oxygen, carbon dioxide, moisture and the like in a short period of time, thereby directly separating nitrogen.

Separation of nitrogen from a gaseous mixture such as air by PSA process with an adsorbent of CMS generally comprises the steps of pressurization adsorption, pressure equalization, desorption and regeneration and the like and utilizes a plurality of adsorbers to change over these steps alternately and successively, thereby continuously obtaining nitrogen. Pressure equalization is a process which comprises transferring the gas remaining in an adsorber having completed adsorption, by utilizing pressure difference, to another adsorber having completed regeneration, until the internal pressures of the two adsorbers become nearly the same. This process is carried out to decrease the unit requirements of raw material gas and power.

Various measures are taken, in the course of each of the above steps, to increase the purity of product nitrogen gas. For example, a method comprises cleaning an adsorber being regenerated by passing therethrough a small amount of product nitrogen; one comprises, when an adsorber has just completed both regeneration and pressure equalization and is ready for adsorption operation, flowing back product nitrogen in an amount required for transferring low-purity nitrogen staying at a space near the outlet of the adsorber during the equalization operation, to the bed in the adsorber; one comprises discharging out of the system or returning, for re-use, into raw gas, the nitrogen with relatively low purity that has generated just after the start of adsorption operation; and the like.

Pressure equalization causes sudden pressure changes in the two adsorbers concerned, whereby CMS tends to flow and be pulverized due to grinding action among granules. To minimize such pulverization, there is proposed reduction in the flow rate of transferring gas to prolong depressurization time.

PSA-type nitrogen gas separation apparatuses with adsorbing beds comprising CMS and using a raw material gas of air or the like, are based on simple mechanism and can produce on-site, when necessary, inexpensive nitrogen. The apparatuses have the feature of reliable safety and capability for conducting full-automatic unmanned operation, and have hence expanded their market rapidly.

When compared with the existing processes for producing nitrogen, as represented by cryogenic separation, the nitrogen obtained through PSA-type nitrogen separating apparatuses has lower purity, which has been constituting the largest obstacle to spreading uses of the gas. Where the purity standard of nitrogen (purity of nitrogen is the total volume percentage of nitrogen and argon; hereinafter the same will apply) is set at at least 99.9%, the product yield decreases and the unit requirement of raw gas worsens markedly. To meet requirement for high-purity nitrogen, it is therefore necessary to add to a PSA apparatus a purification apparatus utilizing a process which comprises adding hydrogen to the nitrogen separated by PSA, permitting it to react with remaining oxygen in the presence of a catalyst to form water and removing the water, or the like. Employment of this process or the like creates many problems such as use of dangerous hydrogen, contamination of unreacted hydrogen into product nitrogen and increase of equipment cost.

SUMMARY OF THE INVENTION

Accordingly, an object of the present invention is to provide a process for separating high-purity nitrogen gas comprising nitrogen with a purity of at least 99.99%.

The present inventors have studied how to obtain high-purity nitrogen by PSA nitrogen separation system with adsorbing beds of carbon molecular sieve, the relationship between the operation system of PSA and the purity of the resulting nitrogen. As a result, it was found that the purity of nitrogen can markedly be increased by modifying the usual pressure equalization step as follows:

i) partial discharging of the gas being transferred during pressure equalization step, from a connecting section between an adsorber having completed adsorption and another adsorber having completed regeneration; and ii) avoiding too long time for the step to assure high purity of product nitrogen.

Due to the above ii), the pressures of the two adsorbers having completed this step may sometimes be not nearly equal but remain considerably different from each other. In the present invention, hereinafter this step is therefore called not "pressure equalization step" but "gas transfer step".

Thus, the present invention provides a process for separating nitrogen, with a nitrogen gas separation apparatus of pressure-swing adsorption type which comprises a plurality of adsorbers filled with carbon molecular sieve and a nitrogen holder, by alternately repeating the successive steps of:

selectively adsorbing oxygen from a gaseous mixture principally comprising nitrogen and oxygen, while withdrawing nitrogen, and regenerating carbon molecular sieve by releasing the adsorbed oxygen;

said process comprising a gas transfer step which comprises transferring at least part of the gas contained in an adsorber having completed adsorption step to another adsorber having completed regeneration step, said gas transfer step further comprising discharging outwardly part of the gas being transferred.

BRIEF DESCRIPTION OF THE DRAWING

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
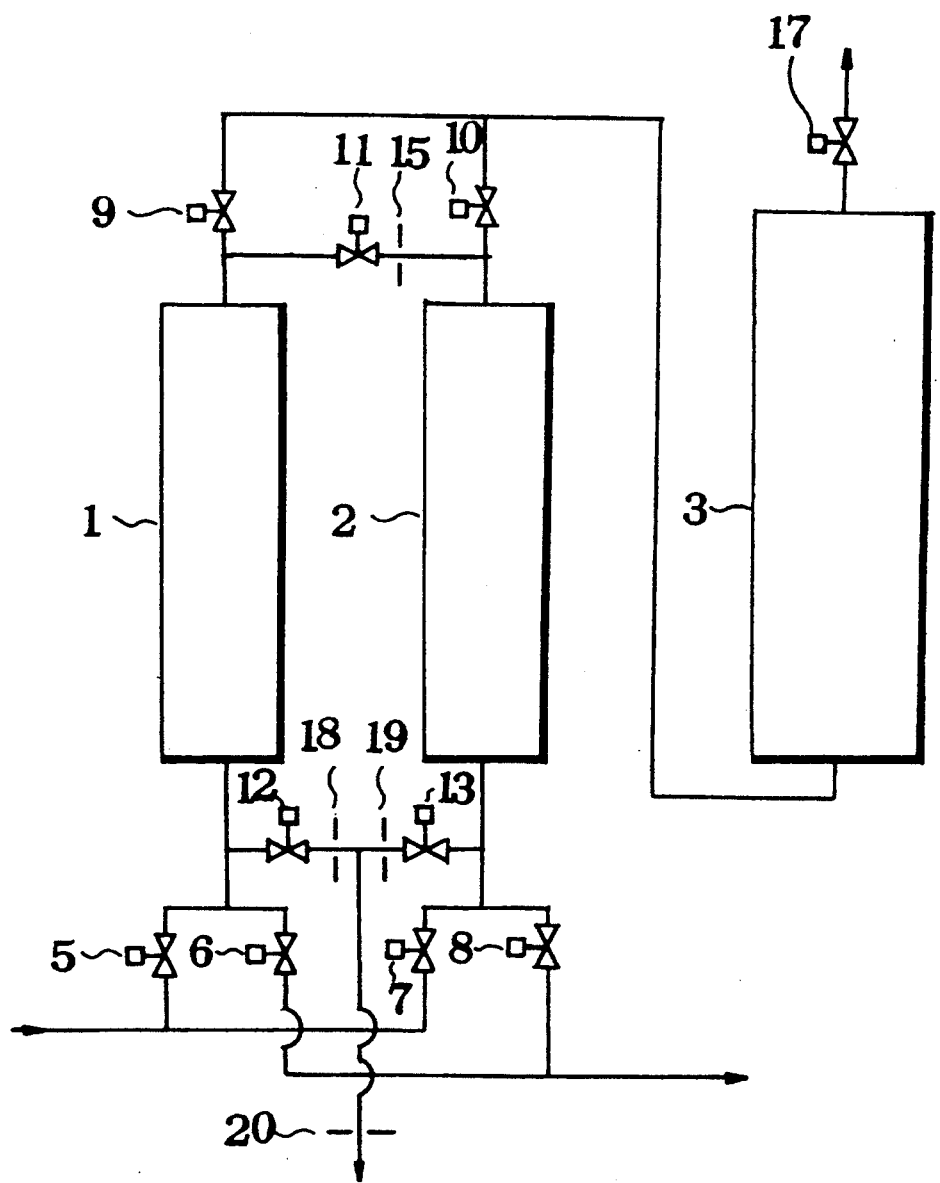
FIG. 1 shows a flow sheet of the PSA nitrogen separation system of the present invention.

The carbon molecular sieve used in the process of the present invention is a carbon-based adsorbent having, for oxygen and nitrogen, nearly the same equilibrium adsorption but markedly different adsorption rates. The PSA system in the present invention separate nitrogen by using the above characteristics of carbon molecular sieve. The system of the present invention uses, in general, two adsorbers packed with carbon molecular sieve and alternately repeating the cycle of pressurization-adsorption, depressurization-regeneration and gas transfer, with a phase difference of 180°, thereby obtaining nitrogen continuously.

As mentioned above, the system of the present invention in general utilizes two adsorbers, however, the number of adsorbers contained in this system is not restricted to two adsorbers which are operated alternatively with a phase difference of 180°, but can be more than two adsorbers. In the present invention, when more than two adsorbers are utilized, for example, if three adsorbers are utilized, the three adsorbers can be operated with a phase difference of 120°.

While CMS is used as an adsorbent in the adsorbers, a dewatering agent such as alumina may be placed together with CMS near the inlet part of the adsorbers.

Any raw material gas can be used insofar as it comprises a gaseous mixture principally containing nitrogen and oxygen, in a wide range of composition, but air is generally used as raw material. Air is, while being pressurized, fed to an adsorber of PSA system. The present system is explained by reference to FIGS. 1 and 2.

A gaseous mixture principally comprising nitrogen and oxygen, such as air or a recovered nitrogen with decreased purity enters adsorber 1 through a valve 5. CMS packed in the adsorber preferentially adsorbs oxygen, whereby components including practically unadsorbed nitrogen are separated and nitrogen enters, via valve 9, product holder 3.

When there has been elapsed a designated time previously set such that feed gas stops just before the adsorbing performance of the CMS in an adsorber 1 reaches the acceptable limit, valves 5 and 9 are closed to terminate the adsorption in adsorber 1. At the same time, valve 11 and valves 12 and 13 located between adsorber 1 and another adsorber 2 which has completed regeneration are opened to achieve communication between the product gas outlets of the two adsorbers (hereinafter referred to as "upper communication") and that between the feed gas inlets of the two adsorbers (hereinafter referred to as "lower communication") simultaneously. Then, the pressurized gas remaining in adsorber 1 having high nitrogen content transfers to adsorber 2 having completed regeneration and with low internal pressure. Gas transfer can be achieved not only by, as described above, simultaneous upper and lower communications but also by many other methods, including upper or lower communication alone, connection between, as necessary, the product outlet of adsorber 1 and the feed gas inlet of adsorber 2, that between the feed gas inlet of adsorber 1 and the product gas outlet of adsorber 2 and the like.

Figure 2:
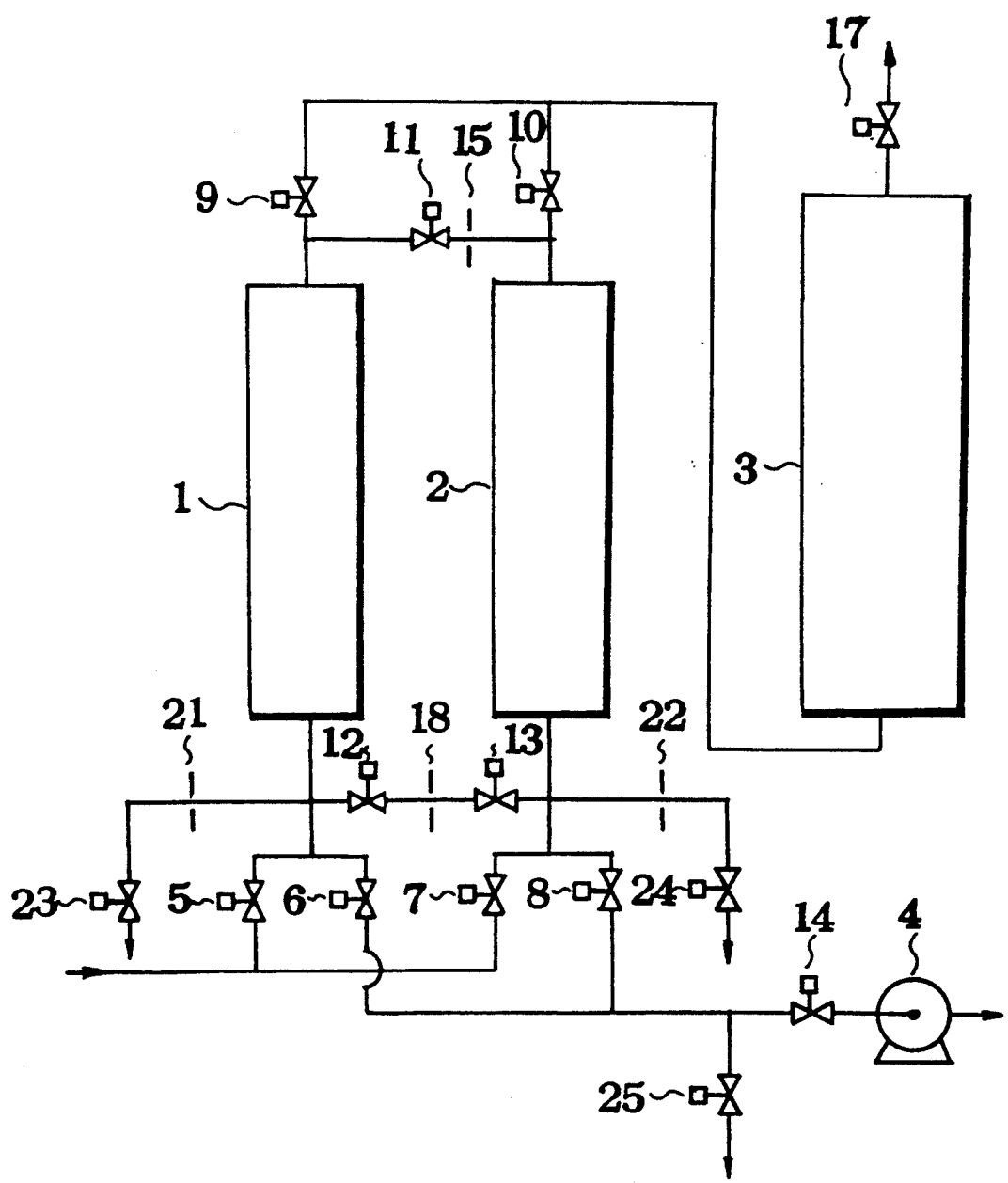
FIG. 2 shows a flow sheet of the PSA nitrogen separation system of the present invention, including a vacuum pump to desorb the oxygen absorbed by carbon molecular sieve.

In the present invention, part of the gas being transferred upon the above gas transfer is discharged through an orifice 20 in FIG. 1 or through orifices 21 and 22 and valves 23 and 24 in FIG. 2. As a result of a study on the influence of the above gas transfer operation on the purity of the product nitrogen, the present inventors found that, discharging of part of the transferring gas out of the system can increase the purity of the product nitrogen, the discharging being conducted not only through a path as shown in FIG. 1 or FIG. 2 but also through any other path.

Upon this discharging, it is preferred that the total amount in liters of the gas discharged, Q (0° C., 1 atm), be in the following range:

$$Q = 0.02 \, (a \times b) \text{ to } 0.3 \, (a \times b)$$

where
 a = capacity in liters of each of adsorbers and
 b = pressure in kg/cm²G in adsorber having completed adsorption step.

The flow rate and the ratio between the amount discharged and that transferred are adjusted, in FIG. 1, by the opening areas of orifice 18, 19 and 20 and the transfer time or, in FIG. 2, by the opening areas of orifices 18, 21 and 22. Here, since a gas transfer time exceeding 3 seconds causes the product nitrogen to tend to be of decreased purity, it is desirable to adjust the opening areas of the orifices such that the transfer time is shorter than 3 seconds.

After completion of gas transfer, valves 11, 12 and 13 in FIG. 1 or FIG. 2 are closed. Then, valve 6 in FIG. 1, or valves 6 and 25 in FIG. 2 are opened, thereby discharging the remaining gas in adsorber 1 until the internal pressure reaches atmospheric pressure. After the internal pressure of adsorber 1 has reached atmospheric pressure, in FIG. 2, valve 25 is closed and valve 14 is opened, and vacuum pump 4 is operated to suck the remaining gas in adsorber 1, until desorption of oxygen from CMS in the adsorber is performed sufficiently.

When adsorber 2 is used for adsorption of oxygen, gaseous mixture enters through a valve 7 and separated nitrogen enters, via valve 10, product holder 3. Then after completion of gas transfer from adsorber 2 to adsorber 1, valve 8 in FIG. 1, valves 8 and 25 in FIG. 2, are opened, thereby discharging the remaining gas in adsorber 2 until the internal pressure of the adsorber reaches atmospheric pressure and furthermore, in FIG. 2, valve 14 is opened, vacuum pump 4 is operated to suck the remaining gas in adsorber 2, until desorption of oxygen from the CMS in the adsorber is performed sufficiently. Thus, the obtained nitrogen in product holder 3 is used through valve 17.

While the above explanation has been made by reference to FIGS. 1 and 2, the methods for discharging part of the transferring gas are not limited to these. For example, there may be conducted direct discharging from the lower part of adsorber 1, which method produces substantially the same effect as that with the case where part of gas is discharged during gas transfer through a conduit between the feed gas inlets of the two adsorbers.

The mechanism of improvement in the purity of product nitrogen by partial discharging of lower communication gas during gas transfer is not quite clear, but it is considered to be as follows. The gas in the upper part of the adsorber conducting adsorption has low oxygen concentration, while that in the lower part has high oxygen concentration. When the amount of gas transferred through upper communication increases, the gas in the lower part of the adsorber and having high oxygen concentration moves upward and decreases the purity of the product nitrogen. Likewise, when the amount of gas transferred through lower communication increases, that means the gas in the lower part of the adsorber and having high oxygen concentration is transferred in a large amount to another adsorber having completed regeneration, the purity of product nitrogen decreases. Discharging of part of the gas being transferred therefore eliminates the two causes of decreasing the purity.

In gas transfer step, where the feed gas inlets of adsorber 1 having completed adsorption step and adsorber 2 having completed regeneration step are connected with each other and so are the product nitrogen outlets of the two adsorbers so that the gas in adsorber 1 is transferred to adsorber 2, either too large or too small a ratio between the amount of gas transferred through upper communication and that through lower communication decreases the purity of the product nitrogen. The ratio is, from test results as shown in Examples to be described later herein, preferably 0.05 to 1.0.

The flow rate of upper communication to lower communication is adjusted by the opening area of orifices 15, 18 and 19 in FIG. 1, or of orifices 15, 18, 21 and 22 in FIG. 2.

The product purity will also decrease, if the ratio between the internal pressure ($kg/cm_2G$) of adsorber 2 and that of adsorber 1 before starting of gas transfer (hereinafter this ratio is referred to as "Pr") is too large. The Pr is, as shown in Examples (Tables 1 and 2), preferably in a range of 20 to 47%.

When the next adsorption is started with adsorber 2, too low an internal pressure thereof causes the feed gas to pass through it in a very short time so that the gas enters the product holder without, sometimes, being sufficiently separated. In this case high-purity product cannot be obtained. It is therefore preferable to open valve 10 to flow back nitrogen from product holder 3 into adsorber 2, thereby preventing nitrogen gas having been insufficiently separated, from entering the product holder.

Product holder 3 is provided to make uniform the product purity by mixing and diluting nitrogen with comparatively low purity generated at an early period of adsorption. The minimum capacity of the holder has been settled to meet this purpose. In addition, it is preferable to design the capacity of product holder 3 such that the gauge pressure of the holder is always maintained at at least 70%, more preferably at least 80% of the maximum pressure attainable of the adsorber during adsorption operation. That is, it is desirable to start new adsorption operation with an adsorber having completed regeneration and gas transfer, after flowing back the nitrogen once stocked in the product holder into the adsorber until the internal pressure reaches at least 70%, more preferably at least 80%, of the maximum pressure (gauge pressure) of the adsorber to be attainable during the succeeding adsorption operation.

Adsorber 2 starts adsorption operation by receiving feed gas via valve 7. Experiments conducted by the present inventors show that, to increase the purity of product nitrogen further, an internal pressure of at least 5 $kg/cm^2G$ is necessary for the adsorber. The purity however levels off with the internal pressure exceeding 10 $kg/cm^2G$. The internal pressure is therefore preferably in a range of 6 to 10 $kg/cm^2$. For adsorber 1, on the other hand, valve 6 is opened when the gas transfer between the adsorbers is stopped, so that the gas adsorbed and remaining in the adsorber is discharged outwardly until the internal pressure decreases near atmospheric pressure, thus conducting regeneration operation until adsorber 2 finishes adsorption operation. If necessary, the gas remaining in adsorber 2 is, as described before, sucked with a vacuum pump, which operation can still more completely desorb the oxygen adsorbed in carbon molecular sieve.

Adsorber 1 and adsorber 2 thus alternately repeat adsorption and regeneration with a phase difference of 180°. The optimum time for adsorption including gas transfer and flowing back, i.e. the optimum time of half-cycle is generally in a range of 60 to 180 seconds.

The PSA type nitrogen separating process of the present invention can provide, from air or the like, nitrogen having a purity of at least 99.99%, which has been difficult with conventional PSA system. The process can, when such a high purity is not required, render it possible to decrease the amount of CMS required, to make compact the equipment and to save power cost accompanied by reduction in unit requirement of raw gas, thereby decreasing the cost of product nitrogen.

Other features of the invention will become apparent in the course of the following descriptions of exemplary embodiments which are given for illustration of the invention and are not intended to be limiting thereof.

EXAMPLES

Examples 1 through 4 and Comparative Examples 1 through 3

Through a PSA type nitrogen separation system comprising 2 sets of 1-liter capacity adsorbers packed with CMS, as shown in FIG. 1, nitrogen was obtained from air being pressurized to 7 $kg/cm^2$ by alternately conducting adsorption and regeneration operations at a half-cycle time of 100 seconds and a constant product flow rate of 1 liter/min.

For the operations, there were varied, as shown in Table 1, the conditions of the amount of gas discharged from lower communication part, the ratio of flow rates, when the feed gas inlets and product nitrogen outlets of the two adsorbers were connected with each other, between the gas in the nitrogen outlet side and that in the feed gas inlet side, and the ratio of internal pressures at the end of gas transfer step. The concentration of remaining oxygen in product nitrogen in each test is shown in Table 1.

TABLE 1

| | | Amount of gas discharged (Q), l | Pressure ratio at the end of gas transfer (Pr) % | Ratio of flow rates of gases transferred | Concentration of oxygen remaining in product nitrogen, ppm |
|---|---|---|---|---|---|
| Ex- | 1 | 0.3 | 40 | 0.8 | 67 |
| ample | 2 | 0.6 | 25 | 0.5 | 55 |
| | 3 | 2.0 | 25 | 0.5 | 75 |
| | 4 | 2.5 | 25 | 0.5 | 115 |
| Comp. | 1 | 0.0 | 25 | 0.5 | 110 |
| Ex. | 2 | 0.0 | 49 | 0.5 | 125 |
| | 3 | 0.0 | 49 | 1.2 | 140 |

As is clear from the table, maintaining the amount of the gas discharged from the feed gas inlet side within the preferred range of the present invention is effective, together with the effects of specific ratio of flow rates of gases of the inlet side and the outlet side and specific pressure ratio at the end of gas transfer, for increasing the product gas purity, thereby obtaining nitrogen having a purity of at least 99.99%.

Examples 5 through 8 and Comparative Examples 4 through 6

Through a PSA type nitrogen separation system comprising 2 sets of 1-liter capacity adsorbers packed with CMS, as shown in FIG. 2, nitrogen was obtained from air being pressurized to 7 kg/cm² by alternately conducting adsorption and regeneration operations at a half-cycle time of 100 seconds and a constant product flow rate of 1.5 liter/min.

For the operations, there were varied, as shown in Table 2, the conditions of the amount of gas discharged from lower communication part, the ratio of flow rates, when the feed gas inlets and product nitrogen outlets of the two adsorbers were connected with each other, between the gas in the nitrogen outlet side and that in the feed gas inlet side, and the ratio of internal pressures at the end of gas transfer step. The concentration of remaining oxygen in product nitrogen in each of the test is shown in Table 2.

TABLE 2

|  | Amount of gas discharged (Q), l | Pressure ratio at the end of gas transfer (Pr) % | Ratio of flow rates of gases transferred | Concentration of oxygen remaining in product nitrogen, ppm |
|---|---|---|---|---|
| Example 5 | 0.3 | 40 | 0.8 | 62 |
| 6 | 0.6 | 25 | 0.3 | 50 |
| 7 | 2.0 | 25 | 0.3 | 78 |
| 8 | 2.5 | 25 | 0.3 | 105 |
| Comp. 4 | 0 0 | 25 | 0.3 | 102 |
| Ex. 5 | 0.0 | 49 | 0.3 | 118 |
| 6 | 0.0 | 49 | 1.2 | 130 |

As is clear from the table, also when a vacuum pump is used for desorption, maintaining the amount of the gas discharged from the feed gas inlet side within the preferred range of the present invention is effective, like in the cases of the above Examples 1 through 4, thereby obtaining high-purity nitrogen, in particular ones with a purity of at least 99.99%.

Examples 9 and 10

In the above Example 2, the oxygen concentration was measured on the product obtained by the following operation. That is, nitrogen in the product holder was flown back to the adsorber having completed regeneration and, then, when the internal pressure reached 85% of the maximum pressure during adsorption operation, adsorption operation was started. In order to study the influence of the degree of backflow on the concentration of oxygen remaining in nitrogen, adsorption tests were conducted: with no backflow of nitrogen {Example 9; the ratio of the pressure (gauge pressure) just before start of adsorption operation to the maximum pressure (gauge pressure) reached during adsorption operation: 25%} and with backflow of nitrogen {Example 10; the ratio of the pressure (gauge pressure) just before start of adsorption operation to the maximum pressure (gauge pressure) reached during adsorption operation: 50%}. The concentration of oxygen remaining in product nitrogen was measured for each test.

The results, together with the result of Example 2, are shown in Table 3.

TABLE 3

|  | Amount of gas discharged (Q), l | Pressure ratio at the end of gas tansfer (pr) % | Ratio of flow rates of gases transferred | Ratio of pressure at start of adsorption (vs. max. pressure) | Concentration of oxygen remaining in product nitrogen, ppm |
|---|---|---|---|---|---|
| Ex. 9 | 0.6 | 25 | 0.5 | 25 | 85 |
| 10 | 0.6 | 25 | 0.5 | 50 | 80 |
| 2 | 0.6 | 25 | 0.5 | 85 | 55 |

Obviously, numerous modifications and variations of the present invention are possible in light of the above teachings. It is therefore to be understood that within the scope of the appended claims, the invention may be practiced otherwise than as specifically described herein.

What is claimed is:

1. A process for separating nitrogen gas from a pressurized gas mixture predominantly composed of nitrogen gas and oxygen gas in a nitrogen gas separation apparatus of a pressure swing adsorption system, having at least first and second adsorbers filled with a carbon molecular sieve and a product nitrogen gas holder, the process comprising the steps of:

adsorbing oxygen gas selectively in the first adsorber, from a pressurized gaseous mixture with a carbon molecular sieve, while withdrawing nitrogen gas;

regenerating a carbon molecular sieve in the second adsorber, by releasing the adsorbed oxygen;

carrying out a transfer of the gas under pressure remaining in the first adsorber in which the adsorption step is complete, to the second adsorber in which the regeneration step is complete simultaneously through a piping connecting a raw material gas inlet of the first adsorber to a raw material gas inlet of the second adsorber or/and through a piping connecting a product nitrogen outlet of the first adsorber to a product nitrogen outlet of the second adsorber; and selectively starting an adsorption of oxygen gas in the second adsorber in which the gas transfer step is complete and regenerating the carbon molecular sieve in the first adsorber in which the gas transfer step is complete by releasing the adsorbed oxygen simultaneously, such that said steps of the first adsorber and the second adsorber are alternatively and successively repeated;

wherein:

said gas transfer step comprises the further step of outwardly discharging part of the gas being transferred from the piping connecting the raw material gas inlet of the first adsorber and the raw material gas inlet of the second adsorber, and as required, from the piping connecting the product nitrogen gas outlet of said first and second adsorbers.

2. A process for separating nitrogen according to claim 1, wherein the amount of liters of the gas discharged, Q (0° C., 1 atm), is in the following range:

$$Q = 0.02 \, (a \times b) \text{ to } 0.3 \, (a \times b)$$

where a = capacity in liters of each of the first and second adsorbers; and b = pressure in kg/cm²G in the adsorber of said first and second adsorbers which has completed said adsorption step.

3. A process for separating nitrogen according to claim 1, wherein a ratio between an amount of gas transferred through the connection of the feed gas inlet side and that through the connection on the product nitrogen outlet side is in a range of 0.05 to 1.0 and said gas transfer step is stopped when a ratio between an internal pressure of the adsorber of said first and second adsorbers which has completed regeneration and that of the adsorber of said first and second adsorbers just before a starting of said gas transfer step becomes 20 to 47%.

4. A process for separating nitrogen gas from a pressurized gas mixture predominantly composed of nitrogen gas and oxygen gas in a nitrogen gas separation apparatus of a pressure swing adsorption system, having at least first and second adsorbers filled with a carbon molecular sieve and a product nitrogen gas holder, the process comprising the steps of:

adsorbing oxygen gas selectively in the first adsorber, from a pressurized gaseous mixture with a carbon molecular sieve, while withdrawing nitrogen gas;

regenerating a carbon molecular sieve in the second adsorber, by releasing the adsorbed oxygen;

carrying out a transfer of the gas under pressure remaining in the first adsorber in which the adsorption step is complete, to the second adsorber in which the regeneration step is complete simultaneously through a piping connecting a raw material gas inlet of the first adsorber to a raw material gas inlet of the second adsorber or/and through a piping connecting a product nitrogen outlet of the first adsorber to a product nitrogen outlet of the second adsorber; and selectively starting an adsorption of oxygen gas in the second adsorber in which the gas transfer step is complete and regenerating the carbon molecular sieve in the first adsorber in which the gas transfer step is complete by releasing the adsorbed oxygen simultaneously, such that said steps of the first adsorber and the second adsorber are alternatively and successively repeated;

wherein:

said gas transfer step comprises the first step of outwardly discharging part of the gas being transferred from the piping connecting the raw material gas inlets of the first and second adsorbers, and as required, from the piping connecting the product nitrogen gas outlets of the first and second adsorbers;

said process comprising the further step of flowing back product nitrogen gas from said nitrogen gas holder to an adsorber of said first and second adsorbers which has completed regeneration and starting the adsorption step of the adsorber of the first and second adsorbers which has completed regeneration when its internal pressure has reached at least 70% of a maximum pressure of the adsorber to be attainable during the adsorption step.

* * * * *